United States Patent [19]

Maitland et al.

[11] Patent Number: 4,858,237
[45] Date of Patent: Aug. 15, 1989

[54] ELECTRON BEAM APPARATUS

[75] Inventors: Arthur Maitland, St Andrews, Scotland; Clifford R. Weatherup, Chelmsford, United Kingdom

[73] Assignee: English Electric Valve Company Limited, Chelmsford, United Kingdom

[21] Appl. No.: 51,793

[22] Filed: May 20, 1987

[30] Foreign Application Priority Data

Jun. 14, 1986 [GB] United Kingdom ............... 8614541

[51] Int. Cl.$^4$ .............................................. H01S 3/03
[52] U.S. Cl. ...................................... 372/2; 372/61; 372/74; 372/88; 313/618; 313/613; 313/599; 313/590
[58] Field of Search ................... 372/62, 61, 88, 87, 372/81, 2, 74; 313/618, 590, 599, 613, 614, 615

[56] References Cited

U.S. PATENT DOCUMENTS

| | | | |
|---|---|---|---|
| 3,460,053 | 11/1966 | Leonard | 372/62 |
| 3,492,598 | 1/1970 | MacNair | 372/88 |
| 3,543,182 | 11/1970 | Witteman et al. | 331/94.5 |
| 3,678,409 | 7/1972 | Rose | 372/74 |
| 3,750,047 | 7/1973 | Gilson | 372/88 |
| 3,831,052 | 8/1974 | Knechtli | 372/74 |
| 3,931,589 | 1/1976 | Aisenberg et al. | 372/74 |
| 4,031,428 | 6/1977 | Tokudome et al. | 372/88 |
| 4,287,484 | 9/1981 | Wang et al. | 372/88 |
| 4,698,546 | 10/1987 | Maitland et al. | 313/618 |
| 4,758,766 | 7/1988 | Weatherup et al. | 313/595 |

FOREIGN PATENT DOCUMENTS

| | | | |
|---|---|---|---|
| 0015297 | 9/1980 | European Pat. Off. | |
| 0095588 | 5/1986 | Japan | 372/87 |
| 1032063 | 6/1966 | United Kingdom | 313/618 |
| 1099413 | 1/1968 | United Kingdom | 313/618 |
| 1390309 | 9/1975 | United Kingdom | |

OTHER PUBLICATIONS

Huchital et al; "Argon Laser ... Hollow Cathode Discharge"; IEEE Journal of Quantum Electronics, vol. QE-3, No. 9; 09/9167; 378-379.

Primary Examiner—William L. Sikes
Assistant Examiner—Xuan Thi Vo
Attorney, Agent, or Firm—Spencer & Frank

[57] ABSTRACT

A laser arrangement includes electron beam apparatus comprising a plurality of electrodes, each of which having an aperture therethrough. The apertures are aligned along the longitudinal axis of an envelope which surrounds them and contains gas. The electrodes are electrically connected such that, of an adjacent pair, one is at a lower potential than the other. An electron beam is produced between the first electrode and an adjacent electrode, and is accelerated along the axis through the apertures, the electron current increasing in magnitude. The electron beam produced is used to provide pumping powder to the gas contained within the envelope such that it acts as a laser amplifying medium.

16 Claims, 2 Drawing Sheets

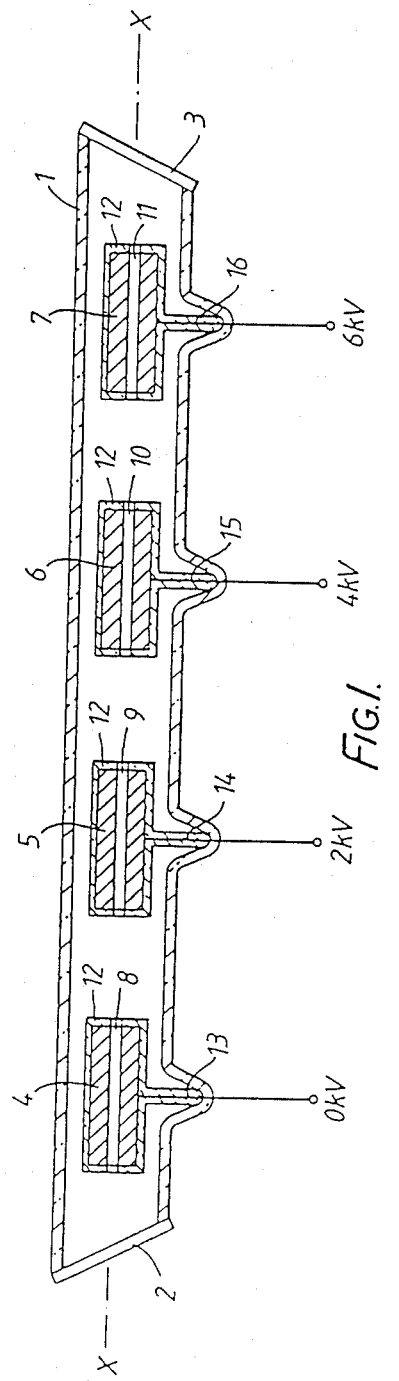
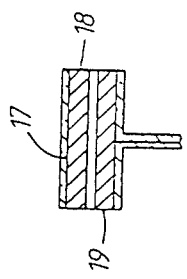
FIG.1.
FIG.2.

ELECTRON BEAM APPARATUS

BACKGROUND OF THE INVENTION

This invention relates to electron beam apparatus and more particularly, but not exclusively, to laser apparatus which includes the use of an electron beam.

It is known, for example as described in U.S. Pat. No. 4,698,546, issued Oct. 6, 1987 to Arthur Maitland et al., that an electron beam may be formed in a device comprising an anode and cathode arranged within a gas filled envelope, the cathode having a hole in a surface and, except for the area within the hole, being substantially covered by a layer of insulating material. An electron beam is obtained on application of a suitably large potential difference between the anode and the cathode when a gas discharge is formed. The electron beam originates from within the hole and emerges from the hole in a direction which is normal to the metal surface of the cathode in which the hole is located.

SUMMARY OF THE INVENTION

According to this invention, there is provided electron beam apparatus comprising means for forming an electron beam; an electrode contained within a gas-filled envelope, said electrode having an aperture therethrough and, except within the aperture, being coated over substantially all its surface with electrically insulating material; and means for accelarating electrons of the beam through the aperture. Apparatus in accordance with the invention enables the energy of the electron beam and the magnitude of the beam current to be increased. Such apparatus is particularly useful therefore in devices such as for example lasers, x-ray sources, and in electron beam welding apparatus. The electrode tends to keep the electron beam well collimated, reducing dispersion and enabling a relatively long path length to be achieved.

Preferably, the means for forming an electron beam comprises, within the envelope, a cathode having a hole therein and, except within the hole, being coated over substantially all its surface with electrically insulating material; and an anode, the arrangement being such that when a suitably high voltage is applied between the cathode and the anode an electron beam is formed extensive in a direction away from said hole. Such means for forming an electron beam may be arranged to produce a well collimated, highly directional electron beam. It may be advantageous that the hole is an aperture which extends through the cathode from one face to another, but it could of course be closed or blind. Where the means for forming an electron beam includes a cathode and anode as mentioned above, the electrode may conveniently and advantageously be arranged to be the anode.

Alternatively, an arrangement for forming an electron beam may be used which is similar to that described above but in which the cathode is not coated with electrically insulating material. The anode is then spaced from the bare cathode surface by such a distance that there is substantially no discharge between them, except in the region of the hole, when the potential difference is applied between them. The spacing between the cathode and anode is appropriately chosen in accordance with Paschen's law, and depends on the gas pressure and voltage employed.

It is preferred that a plurality of electrodes are included, each having an aperture therethrough and being arranged such that the electron beam passes through each of the apertures in turn. In such an arrangement, some amplification occurs at each electrode, giving a larger resultant beam current than would be obtained from a single electrode. It is preferred that the electrodes are arranged such that the apertures are aligned, this being a particularly convenient arrangement. Preferably, for an adjacent pair of electrodes, the one which the electron beam is arranged to pass through first is at a lower potential than the other. Thus, where several electrodes are spaced apart along an axis, with their apertures being coaxially aligned, each is maintained at a higher potential than a preceding one, and thus acts as the means for accelerating electrons of the beam through the aperture of the preceding electrode. An increase in electron energy and electron current is obtained at each electrode. Since the electron beam is collimated as it emerges from each aperture, the total path length of the electron beam from the first electrode to the last may be made as long as desired, for example, a meter or more which is desirable in some applications of the apparatus. To obtain an electron beam over a substantial length in a gas would normally require that the beam be confined by a magnetic field of a long solenoid. Apparatus in accordance with the invention does not require a solenoid to obtain a long, well collimated electron beam.

The or each electrode may have more than one aperture therethrough, with respective electron beams being arranged to pass through respective apertures. This may prove particularly suitable in apparatus in which it is desired, for example, to direct a relatively large amount of energy from the electron beams within a given volume, since each beam may deliver substantially the same amount of energy as a single one would, or where it is required to irradiate a body or region over a relatively large area.

According to a feature of this invention, a laser arrangement includes apparatus in accordance with the invention, wherein an electron beam is arranged to provide pumping power to material which is arranged to form at least part of a laser active medium, and preferably, the envelope contains the electrodes and the material. Apparatus in accordance with the invention is particularly useful in a laser arrangement, since the apertures of the electrodes may be arranged along the optical axis of the laser, the electron beam then being created and directed through the region where it desired to produce the laser radiation. Where an electron beam is obtained by employing a cathode having a hole in a surface thereof, the hole advantageously passes through the cathode to present an unobstructed path through the apparatus to laser radiation.

BRIEF DESCRIPTION OF THE DRAWINGS

The invention is now further described by way of example with reference to the accompanying drawings, in which:

FIG. 1 is a schematic longitudinal section of a laser arrangement in accordance with the invention;

FIG. 2 illustrates an alternative component of the apparatus of FIG. 1; and

DESCRIPTION OF PREFERRED EMBODIMENTS

Figures 3, 4:
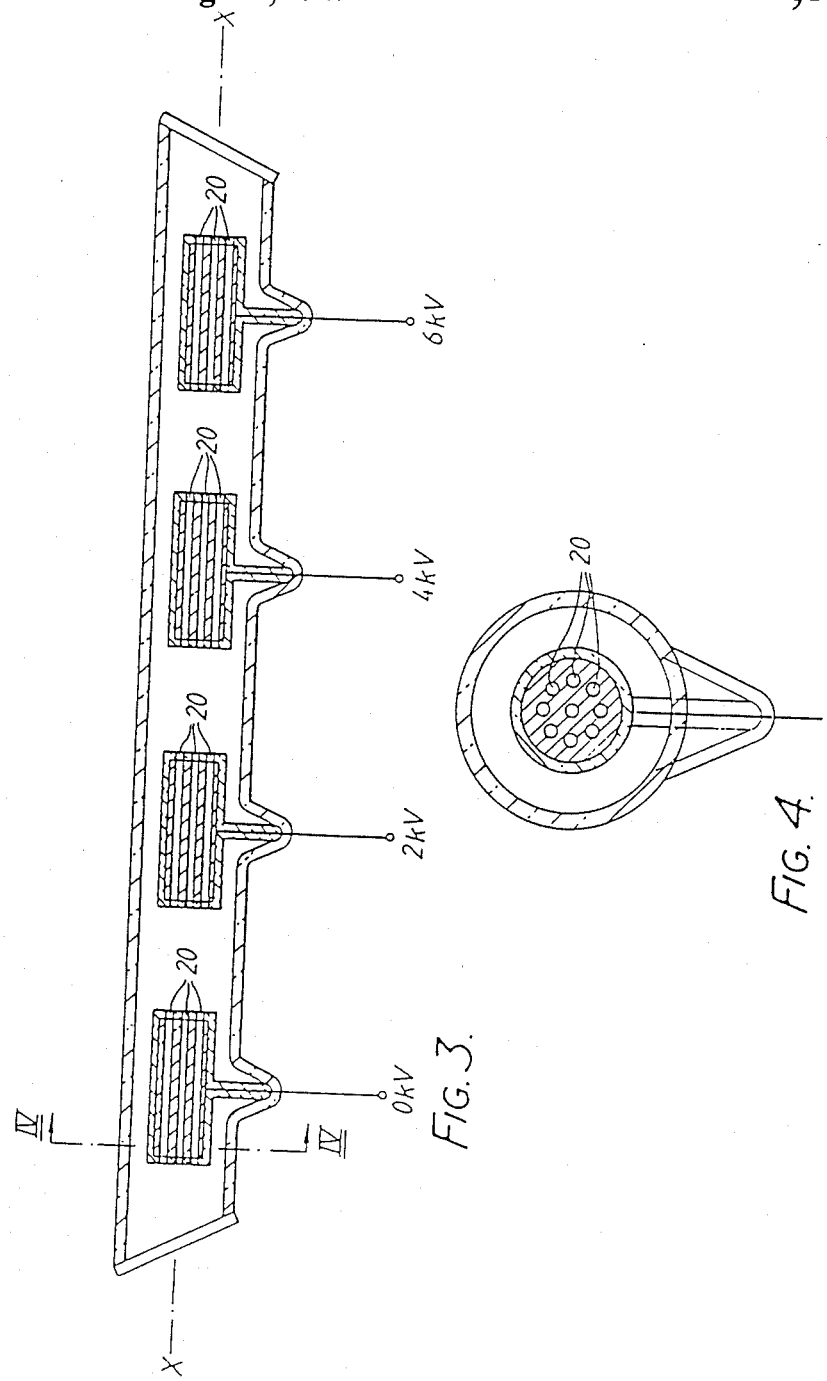
FIGS. 3 and 4 illustrate schematically in longitudinal and transverse section respectively another laser arrangement in accordance with the invention.

With reference to FIG. 1, a laser arrangement includes a cylindrical ceramic envelope 1 having windows 2 and 3 at each end. Electrodes, only four of which 4, 5, 6 and 7 are shown, are spaced apart from one another along, and co-axially about, the longitudinal axis X-X, which is the optical axis of the laser. Each of the electrodes 4, 5, 6 and 7 is a metal cylinder having a cylindrical aperture 8, 9, 10 and 11 respectively therethrough, the apertures being aligned along the longitudinal axis X-X. Substantially the whole of the surface of each of the electrodes 4, 5, 6 and 7 is coated with a layer 12 of electrically insulating material, which may conveniently be for example, glass or ceramic. The walls of the apertures 8, 9, 10 and 11 are not coated with the electrically insulating material but are left bare. Each of the electrodes is connected to an electrical conductor 13, 14, 15 and 16 which passes out of the envelope via one of a plurality of side arms, and is also coated with electrically insulating material. The electrodes 4, 5, 6, and 7 are connected such that one end electrode 4 is maintained at a low potential and the other end electrode 7 is maintained at a higher potential, with intermediate electrodes being maintained at potentials lying between these two extremes, being arranged such that the electrode potentials progressively increase along the axis X-X. The envelope 1 also contains a gas which is to be pumped by the electron beam to form a laser active medium. A suitable gas may be argon, for example, at a pressure of several hundred millitor (tens of Pa). Typically, an electrode has a length of 3 cm and a diameter of 1 cm, with an aperture diameter of about 2 mm. Adjacent electrodes may be spaced apart by 3 cm. Thus for an electron beam length of about 1 m fifteen of such electrodes would be required.

During operation of the arrangement shown in FIG. 1, one end electrode 4 is maintained at ground potential, the adjacent electrode 5 at a potential of 2 kV, the next at 2 kV higher and so on. The difference in potential between the end electrode 4 and the adjacent electrode 5 is large enough to cause an electron beam to be formed extensive in a direction away from the aperture 8 from the electrode 4, the adjacent electrode 5 acting as an anode. The electron beam is accelerated through the aperture 9 of the electrode 5 because of the potential difference which exists between that electrode and the adjacent electrode 6. As the electron beam is accelerated through the aperture 9, additional electrons from the surface of the aperture 9 add to the beam and the electron beam current is thereby increased. The increase in electron beam current also occurs at subsequent electrodes to give a larger beam current at the final electrode 7 than that which is produced at the first electrode 4.

The amplified electron beam current provides pumping power to the gas contained within the envelope 1 and may be made great enough to cause laser action to be initiated along the axis X-X.

With reference to FIG. 2, although each of the electrodes 4, 5, 6, and 7 of the arrangement shown in FIG. 1 is coated over all its surfaces with electrically insulating material, except for the surface of the hole, only the surface 17 parallel to the axis may be coated to provide the insulating material over substantially all its surfaces, leaving the ends 18 and 19 free of electrically insulating material.

With reference to FIGS. 3 and 4, a laser arrangement is similar to that described with reference to FIG. 1, except that in this case each electrode includes a plurality of apertures 20 passing from one of its surfaces to the other. This enables increased power to be delivered to the gas contained within the envelope and thus aids in creating laser action.

We claim:

1. Electron beam apparatus comprising: means for forming a highly directional electron beam having a beam path, the electron beam delivering energy to a media; a gas-filled envelope containing an electrode, said electrode having an aperture therethrough and, except within said aperture, being coated over substantially all its surface with electrically insulating material, said electrode being disposed so that said aperture lies along said beam path and said electrode extends in the direction of said beam path; and means for accelerating electrons of the beam through said aperture.

2. Apparatus as claimed in claim 1, wherein said means for forming an electron beam comprises an anode and a cathode within said envelope, said cathode having a hole therein and, except within said hole, being coated over substantially all its surface with electrically insulating material, the arrangement being such that, when a suitably high voltage is applied between said cathode and said anode, an electron beam is formed extensive in a direction away from said hole.

3. Apparatus as claimed in claim 2, wherein said hole is an aperture extending through said cathode from one face to another.

4. Apparatus as claimed in claim 2, wherein said electrode is arranged to act as said anode.

5. Apparatus as claimed in claim 1 and including a plurality of electrodes, each electrode having an aperture therethrough and, except within said aperture, being coated over substantially all its surface with electrically insulating material, the electrodes being arranged such that said electron beam passes through each aperture in turn.

6. Apparatus as claimed in claim 5, wherein said electrodes are arranged such that said apertures are aligned along the longitudinal axis of said envelope.

7. Apparatus as claimed in claim 5, wherein an adjacent pair of electrodes is arranged such that the electrode which said electron beam passes through first is at a lower potential than the other.

8. Apparatus as claimed in claim 1 and wherein said electrode includes a plurality of apertures therethrough and respective electron beams are arranged to pass through respective apertures.

9. Apparatus as claimed in claim 8 and including a plurality of electrodes, each electrode having a plurality of apertures therethrough and, except within said apertures, being coated over substantially all its surface with electrically insulating material, said electrode being arranged such that each of said electron beams passes through one of the apertures in each electrode.

10. A laser arrangement including apparatus as claimed in claim 1 wherein said electron beam is arranged to provide pumping power for at least part of a laser active media.

11. An arrangement as claimed in claim 10, wherein the envelope contains said electrode and said laser active media.

12. an arrangement as claimed in claim 10 wherein said means for forming an electron beam comprises an anode and a cathode within said envelope, said cathode having a hole therein and, except within said hole, being coated over substantially all its surface with electrically insulating material, the arrangement being such that, when a suitably high voltage is applied between said cathode and said anode, an electron beam is formed extensive in a direction away from said hole.

13. An arangement as claimed in claim 12 and including a plurality of electrodes, each electrode having an aperture therethrough and, except within said aperture, being coated over substantially all its surface with electrically insulating material, the electrodes being arranged such that said electron beam passes through each aperture in turn.

14. An arrangement as claimed in claim 13 wherein said electrodes are arranged such that said apertures are aligned along the optical axis of the arrangement.

15. Apparatus as claimed in claim 1, wherein said media comprises the gas in the envelope, and wherein said energy provides pumping in a laser.

16. Electron beam apparatus comprising: an envelope; media in the envelope; means for forming a highly directional electron beam in the envelope, said electron beam having a beam path and delivering energy to said media; an electrode having an aperture therethrough and, except within said aperture, being coated over substantially all its surface with electrically insulating material, said electrode being disposed so that said aperture lies along said beam path and said electrode extends in the direction of said beam path; and means for accelerating electrons of said beam through said aperture.

* * * * *